United States Patent [19]

Etnyre

[11] Patent Number: 4,756,763
[45] Date of Patent: Jul. 12, 1988

[54] METHOD OF MAKING AND USING ASPHALT COMPOSITIONS

[75] Inventor: Robert E. Etnyre, Oregon, Ill.

[73] Assignee: Etnyre International Ltd., Oregon, Ill.

[21] Appl. No.: 9,218

[22] Filed: Jan. 30, 1987

Related U.S. Application Data

[63] Continuation-in-part of Ser. No. 797,049, Nov. 12, 1985, abandoned.

[51] Int. Cl.$^4$ ............................................. C08L 95/00
[52] U.S. Cl. ............................... 106/281 R; 106/274; 208/44
[58] Field of Search ................... 106/273 R, 274, 275, 106/281 R; 208/22, 44

[56] References Cited

U.S. PATENT DOCUMENTS

| | | | |
|---|---|---|---|
| 748,019 | 12/1903 | Rubitschung | 106/281 R |
| 3,738,853 | 6/1973 | Kopvillem et al. | 106/274 |
| 3,970,468 | 7/1976 | Garrigues et al. | 106/274 |
| 3,997,355 | 12/1976 | Santucci et al. | 106/281 R |

FOREIGN PATENT DOCUMENTS 755999 4/1967 Canada.

*Primary Examiner*—Amelia Burgess Yarbrough
*Attorney, Agent, or Firm*—Leydig, Voit & Mayer, Ltd.

[57] ABSTRACT

Crushed sulfur is melted by and is mixed with hot liquid asphalt at a manufacturing plant, after which the mixture is formed into sulfur-asphalt pellets. The sulfur added to the asphalt prevents a mass of the pellets from flowing and conglomerating at ambient temperatures. The pellets thus may be shipped in bulk form and without special temperature control from the manufacturing plant site to a remote site where the pellets are mixed with heated aggregate and are melted to form a sulfur-extended bituminous concrete paving composition for application to a roadway. By mixing a fine mineral filler such as calcium hydroxide with the crushed sulfur and the hot liquid asphalt at the manufacturing plant, temperature-stable pellets may be produced while using a lower ratio of sulfur to asphalt in the mixture. If desired, aggregate also may be added to the mixture at the manufacturing plant to form briquettes and avoid the need of mixing the pellets with aggregate at the paving site.

13 Claims, No Drawings

METHOD OF MAKING AND USING ASPHALT COMPOSITIONS

CROSS-REFERENCE TO A RELATED APPLICATION

This application is a continuation-in-part of my co-pending application Ser. No. 797,049, filed Nov. 12, 1985 and now abandoned.

BACKGROUND OF THE INVENTION

This invention relates generally to a method of making and using an asphalt composition. While the principles of the invention may be used advantageously in various applications involving asphalt, the invention is especially useful in connection with the production and application of bituminous concrete used to pave a roadway or to patch holes in existing pavement.

Bituminous concrete is a mixture of asphalt (e.g., heavy petroleum residues) with aggregate (e.g., gravel and/or sand). The prior art has recognized that the addition of sulfur to bituminous concrete produces certain advantages. For example, Kopvillem et al U.S. Pat. No. 3,738,853 states that pavements of substantially improved strength can be achieved through the use of sulfur-asphalt-aggregate mixes having high ratios of sulfur to asphalt. The patent teaches that the weight ratio of sulfur to asphalt should be at least 1:1 and preferably is from 2:1 to 5:1 or higher.

Metcalf Canadian patent No. 755,999 also discloses a sulfur-asphalt-aggregate paving composition having a weight ratio of sulfur to asphalt of at least 1:1. A more recent example of a sulfur-extended asphalt paving composition is disclosed in Schult U.S. Pat. No. 4,339,277 which teaches the addition of crushed sulfur to heated asphalt on substantially a 1:1 weight basis.

Present techniques for producing, transporting and applying asphalt are cumbersome in many respects. Asphalt is a thermoplastic material which tends to flow at ambient temperatures, the higher the temperature the greater the flow. If a large mass of ostensibly solid asphalt is broken into particles, the material initially will remain in discrete particle form but eventually will flow and re-conglomerate at ambient temperatures.

For this reason, asphalt conventionally is treated as a liquid for handling and shipping purposes. In a typical paving operation involving bituminous concrete, hot asphalt may be delivered in a tank truck from an asphalt manufacturing plant or an asphalt storage site to the site of the roadway to be paved. The hot liquid asphalt is injected into a heated pugmill at the paving site and is mixed with heated and dried aggregate to form a paving composition which is applied to the roadway.

Alternatively, a supply of bituminous concrete may be prepared by heating and drying aggregate in a rotatable drum at a central mixing plant while mixing the aggregate with hot liquid asphalt and perhaps with a small proportion of ground-up re-cycled asphalt pavement. The mix usually is trucked hot from the mixing plant to the job site and is immediately applied to the roadway. In some cases, however, the mix may be stockpiled, later transported to the paving site, re-heated and re-mixed in a heated pugmill and then applied to the roadway.

The most widely used prior methods of making an asphalt paving composition all have one significant feature in common. That is, they all require a supply of hot liquid asphalt to be available either at the road site or at the mixing plant site and they all require that the liquid asphalt be injected into and mixed with the aggregate.

SUMMARY OF THE INVENTION

The general aim of the present invention is to simplify the production and application of asphalt compositions and particularly asphalt paving compositions by providing a new and improved method by which asphalt, and preferably sulfur-extended asphalt, is made in solid and easily handleable form at a manufacturing plant, is shipped from the manufacturing plant in solid form, and is subsequently re-heated to form a flowable paving material or a flowable patching material without requiring a supply of hot liquid asphalt to be delivered to either the mixing plant site or the roadway site.

A more detailed object is to achieve the foregoing by mixing sulfur with hot liquid asphalt at a central manufacturing plant and by using the sulfur not only to improve the stength of the ultimate paving composition but also to raise the flow point of the composition well above the flow point of raw asphalt so that the composition will be non-flowable at ambient temperatures. After a homogeneous mix of sulfur and asphalt has been created, the composition is formed into solid pellets which may be easily handled and which may be readily transported in solid form and without any special temperature control from the central manufacturing plant either to the mixing plant site or to the roadway site.

Another object of the invention is to mix a fine calcium-based mineral filler (e.g., calcium hydroxide) with the hot liquid asphalt and the liquid sulfur at the manufacturing plant before the mixture is cooled and formed into pellets. The addition of mineral filler to the pellets helps make the pellets temperature-stable and enables the sulfur-asphalt ratio to be lowered so as to permit the use of a smaller quantity of relatively expensive sulfur and the use of a larger quantity of less expensive asphalt in the mixture.

In one form of the invention, aggregate such as gravel or crushed stone is added to the hot mixture at the manufacturing plant and the mixture is formed into briquettes. This form of the invention tends to be disadvantageous in that the aggregate increases the bulk and weight of the product which must be shipped from the manufacturing plant. On the other hand, sulfur-asphalt briquettes containing aggregate may be re-heated at the road site to form an excellent patching material which readily flows into and fills potholes without compaction and which, if desired, may be used without the addition of gravel, crushed stones or other similar aggregate. Alternatively, the briquettes may be mixed with various proportions and/or types of heated aggregate at the paving site to form different grades of sulfur-extended bituminous paving compositions for various grades of pavements. Also, the briquettes with aggregate may be used to advantage in those areas where a supply of suitable aggregate is not readily available.

Other objects and advantages of the invention will become apparent from the following detailed description.

DETAILED DESCRIPTION OF THE PREFEFRRED EMBODIMENTS

In practicing the method of the present invention, a mixture of asphalt and sulfur is prepared at a central manufacturing plant. This mixture may be made basically by the same process disclosed in the aforementioned Schult patent to which reference is made for the fundamental steps. Specifically, elemental solid sulfur in bulk form is pulverized and is introduced into liquid asphalt contained in a suitable mixing vat or the like and heated to and maintained at a temperature of about 290 to 300 degrees F. The temperature, however, is not raised significantly above 300 degrees F. in order to avoid degrading the asphalt and in order to avoid noxious fumes from the sulfur.

The asphalt which is used may include any asphalt generally employed in road paving, particularly pyrogenous asphalts derived from petroleum residues such as residual oils, blown petroleum asphalt, soft and hard residual asphalt and the like. Natural asphalt such as gilsonite also may be employed. A preferred asphalt is an asphalt sold by Shell Oil Company under the trade designator AC-20.

As the powdered sulfur is introduced into the vat, it is simultaneously mixed with the liquid asphalt and is melted by the heat energy present in the asphalt. As a result, a substantially homogeneous sulfur-asphalt mixture is formed. It will be appreciated that molten sulfur rather than crushed sulfur could be introduced into and mixed with the liquid asphalt although this requires equipment for heating and maintaining the sulfur at a temperature above 240 degrees F. in order to keep the sulfur in molten form.

The sulfur is added to the asphalt for two purposes. Insofar as the method of the present invention is concerned, an incidental reason for adding the sulfur is to improve the strength and other properties of the ultimate pavement in a manner recognized by the art. The primary reason for adding the sulfur in the practice of the present method is to cause the sulfur to raise the flow point of the sulfur-asphalt mixture to a temperature well above the temperature at which the raw asphalt will flow and conglomerate. Stated differently, a stockpile of discrete particles of raw asphalt will flow and will tend to re-conglomerate as a single mass if the particles are exposed to ambient temperatures for an extended period of time; the re-conglomeration occurring faster, of course, at higher temperatures. The addition of sulfur to asphalt in accordance with the present invention enables the production of solid sulfur-asphalt particles or pellets having an increased flow temperature which prevents the pellets from re-conglomerating at ambient temperatures and which enables the pellets to be treated and handled as a solid at ambient temperatures.

Generally speaking, the higher percentage of sulfur in the mixture, the higher the flow temperature or softening point of the ultimate pellets. Sulfur, however, is expensive when compared to asphalt. Because of the relatively high cost of sulfur, it is desirable to keep the percentage of sulfur in the mixture as low as practical.

In most climates in the United States, the pellets usually will not be subjected to temperatures exceeding 140 degrees F. even when stored in a hot warehouse or when exposed to direct sunlight in midsummer. In order to enable the pellets to withstand 140 degrees F. without tending to conglomerate and without special protection or handling, the preferred ratio of sulfur to asphalt in the mixture is approximately 2.3:1 on a weight basis. In colder climates such as in middle and northern Canada, the maximum exposure temperature may not exceed 110 degrees F. and thus a lower percentage of sulfur may be used for purposes of economy. For example, the ratio of sulfur to asphalt may be on the order of 1.5 to 1. A higher percentage of sulfur also can be used but this increases the cost and may make the pellets so sulfur-rich as to detrimentally affect the asphalt. In general, the ratio of sulfur to asphalt should not exceed 4:1.

The hot sulfur-asphalt mixture from the vat is formed into discrete particles or pellets at the manufacturing plant. While the pellets may vary in shape and size depending upon the circumstances, spherical or cylindrical pellets are preferred, and the minor cross-sectional dimension of the pellets should be at least ⅛" with at least a 1:1 aspect ratio in order to keep the pellets from dusting when exposed to normal winds. Also, when the pellets are to be metered in accurate proportions into aggregate in a manner to be explained subsequently, the cross-sectional dimension of the pellets should be ¾" or below. If metering is not a consideration, the pellets may range upwardly from ¾" to any size and shape that may be conveniently manufactured and handled. For example, the pellets may be sized and shaped generally similar to a conventional charcoal briquette or may even approach the size of a brick.

The sulfur-asphalt mixture from the vat may be formed into pellets in a number of ways. For example, the mixture may be allowed to cool in the form of large chunks which subsequently are broken up and pulverized to form the pellets. Alternatively, the liquid mixture may be poured into and solidified in molds of an appropriate shape and size. Another procedure for forming the pellets involves intermittently metering globs of the liquid material onto a moving steel grid conveyor belt and effecting rapid cooling of the material as it drops through the openings in the belt.

Once formed, the solid pellets may be stockpiled for an indefinite period of time at ambient temperatures. During storage, the solid sulfur stiffens the asphalt and prevents the pellets from flowing and conglomerating. Also, the pellets may be shipped from the manufacturing plant in bulk form and in the same manner as aggregate to either an asphalt/aggregate mixing plant or to the site of the roadway to be paved. If shipped to a mixing plant, the pellets may, for example, be metered continuously at a predetermined rate into a rotating drum mixer for heating and drying aggregate which also is continuously metered into the mixer. The metering may be effected by augers and thus a predetermined quantity of asphalt may be mixed with a predetermined quantity of aggregate without need of liquid asphalt injecting and metering apparatus. The mixture of aggregate and pellets is heated to a temperature of near 300 degrees F. but not significantly above 300 degrees F. as it is advanced through the drum and thus both the asphalt and sulfur are melted to liquid form and are mixed uniformly with the aggregate to form bituminous concrete. The material thus formed may be trucked hot from the mixing plant site to the roadway and applied to the roadway by conventional hot mix paving apparatus. Alternatively, the bituminous concrete may be cooled and stockpiled at the mixing plant site, later transported to the roadway site, re-heated and re-agitated in a pugmill, and then applied to the roadway.

Etnyre U.S. Pat. No. 4,427,376 discloses a rotating drum mixer which, with minor modifications, may be used to heat and mix pellets and aggregate.

Instead of forming a hot mix at a central mixing plant, the mix can be prepared at the roadway itself. By way of example, a batch of aggregate may be heated and dried in a pugmill. After the aggregate has been heated to near, but not significantly above, 300 degrees F., a predetermined quantity of sulfur-asphalt pellets may be metered into the pugmill, melted by the heat energy of the aggregate, mixed with the aggregate in the pugmill and then immediately applied to the roadway. This procedure is advantageous in that the asphalt is kept at an elevated temperature for only a short period of time and is not exposed to a direct flame or to direct intense heat. This reduces oxidation resulting from heat and increases the longevity of the pavement formed by the asphalt.

From the foregoing, it will be apparent that the present invention brings to the art a new and improved method of preparing sulfur-extended bituminous concrete through the use of sulfur-asphalt pellets. By virtue of producing the pellets at a central manufacturing plant, it is not necessary to have a supply of hot liquid asphalt either at the mixing plant site or at the roadway site. Moreover, the elemental sulfur is melted and mixed at the central plant itself so that need for equipment for handling sulfur at the mixing plant or the roadway is eliminated. Special equipment for handling and shipping the pellets is not required and thus a supply of asphalt can be made available to distant areas more economically than has been the case in the past.

The invention also contemplates utilizing the principles discussed above while providing effective pellets of substantially lower cost than pure sulfur-asphalt pellets. Even when the ratio of sulfur to asphalt is on the relatively low order of 1.5:1, a quantity of liquid formed by melting the pellets is higher in cost than an equal quantity of raw asphalt. The cost differential is even higher when the sulfur-asphalt ratio of the pellets is on the relatively high order of 2.3:1 for the purpose of keeping the pellets from flowing at 140 degrees F.

In order to realize virtually all of the advantages of the invention as described thus far while reducing the cost differential resulting from use of the sulfur, a fine mineral filler may be added to the hot liquid asphalt at the same time the crushed sulfur is being mixed with and melted by the asphalt. While various mineral fillers could be used, it has been found that a very fine and very low density calcium-based filler provides the best results. A preferred mineral filler is calcium hydroxide of sufficient fineness to pass through a No. 300 mesh sieve. In some instances, precipitated calcium carbonate of low density or a mixture of calcium hydroxide and precipitated calcium carbonate may be used as the mineral filler. It has been found that calcium oxide also will initially help provide temperature stability but ultimately may be detrimental to the quality of the mix. Finely ground limestone of the type found in the midwest does not seem to work well as a mineral filler, apparently because of its relatively high density and because of impurities.

The quantity of mineral filler to be added to the sulfur-asphalt mixture may be varied depending upon the grade of the asphalt, the ratio of the sulfur to the asphalt and the maximum temperature which the pellets must withstand without significant deformation. It has been found that pellets with excellent deformation resistance at 140 degrees F. are formed by a mixture comprising 71.5% by weight sulfur-asphalt having a sulfur-asphalt ratio of about 1.2:1, and 28.5% by weight calcium hydroxide; the asphalt being grade AC 20. Excellent deformation resistance at 140 degrees F. is exhibited by sulfur-asphalt-filler pellets made from grade AC 10 asphalt where the weight ratio of sulfur to asphalt is 1.5:1 and the overall mixture comprises 71.5% by weight sulfur-asphalt and 28.5% by weight calcium hydroxide. When a grade AC 40 asphalt is used, excellent deformation resistance at 140 degrees F. is achieved by pellets having a 1.5:1 weight ratio of sulfur to asphalt where the overall mixture comprises 77% by weight sulfur-asphalt and 23% by weight calcium hydroxide. With the same grade of asphalt, excellent deformation resistance at 140 degrees F. also is exhibited by pellets having a 1:1 weight ratio of sulfur to asphalt, wherein the overall mixture comprises 69% by weight sulfur-asphalt and 31% by weight calcium hydroxide. Because such mixtures contain a relatively low percentage of sulfur, they may be produced more economically than pure sulfur-asphalt pellets.

It is believed that the addition of the calcium hydroxide or other calcium based mineral filler to the sulfur-asphalt mixture acts in two ways to increase the deformation resistance of the pellets. When the ratio of sulfur to asphalt is above 1.5:1, the sulfur tends to saturate the asphalt and does not tend to settle from the asphalt. But, with ratios below 1.5:1, there is a tendency for the sulfur eventually to settle to the bottom of the pellet and to leave the top of the pellet unstabilized. It is believe that the mineral filler may "float" in the asphalt and attach or bind the sulfur crystals to the asphalt to restrict settling of the sulfur. It is for this reason that a low density filler is preferred since such a filler has better capacity for floating. Also, it is believed that the mineral filler may tend to absorb the volatile fractions remaining in the residual petroleum from which the asphalt is derived and thus may tend to stabilize the viscosity of various asphalts from different sources even though such asphalts ostensibly are of the same grade.

The use of the calcium hydroxide as a filler produces an incidental advantage in that, as is known, calcium hydroxide helps prevent the asphalt from stripping away from aggregate in the presence of water when the pellets are subsequently heated and mixed with aggregate.

In keeping with the invention, aggregate such as gravel, crushed stone or sand may be added to the hot liquid asphalt at the manufacturing plant at the same time the crushed sulfur is being mixed with and melted by the asphalt. The ultimate particles—which, in this case, are formed into briquettes—thus are a mixture of sulfur, asphalt, calcium-based mineral filler and aggregate.

In one specific example, a sulfur-asphalt-filler mixture is made from grade AC 40 asphalt where the ratio of sulfur to asphalt is 1.2:1 and the overall mixture comprises about 74% by weight sulfur-asphalt and 26% by weight calcium hydroxide. This blend is mixed with washed basalt crushed traprock fine aggregate to form a briquette about the size of a conventional charcoal briquette and consisting of about 82.5% by weight of the aggregate and about 17.5% by weight of the sulfur-asphalt-calcium hydroxide blend. In another example, clean concrete sand is used in place of the washed aggregate.

Although the aggregate or sand must be shipped from the manufacturing plant as part of the briquettes and thus adds to the shipping cost, the briquettes do have an advantage over the pellets described previously. That is, the briquettes having aggregate or sand may be simply reheated and used as a pothole patching material without need of mixing any additional aggregate into the material. The patching material thus formed flows readily into and substantially completely fills the hole, need not be tamped or compacted, and may be bladed off smooth with the existing pavement. Of course, additional aggregate such as gravel or crushed stone may, if desired, be mixed into the patching material to improve its quality but even then an advantage is realized from the briquettes. That is, since the briquettes already contain "fines" formed by the calcium hydroxide, the additional aggregate may be washed or clean aggregate having no substantial fines, thus eliminating the need for dust control equipment on the apparatus for drying the aggregate. In addition, the briquettes may be mixed with additional aggregate of whatever type and in whatever proportions necessary to form various grades of paving compositions for paving roadways ranging from low grade country roads to high grade expressways.

I claim:

1. A method of making and using an asphalt composition, said method comprising the steps of, mixing sulfur with asphalt at a manufacturing plant site and at a temperature above the melting point of sulfur but not significiantly above 300 degrees F., forming the mixture into solid pellets at said manufacturing plant site, the cross-sectional dimension of said pellets being at least ⅛ of an inch, the ratio of sulfur to asphalt in said mixture being at least 1.5:1.0 on a weight basis so as to keep said pellts in solid, non-flowable form and to prevent a mass of said pellets from flowing and conglomerating, at any temperature below 110 degrees F., transporting a mass of said solidified pellets from said mixing plant site to a remote site, heating said pellets at said remote site to a temperature above the melting point of sulfur but not significantly above 300 degrees F. thereby to liquefy the mixture, and applying the mixture to a material to be coated.

2. A method as defined in claim 1 in which the ratio of sulfur to asphalt in said mixture is at least 2.3:1.0 on a weight basis to prevent a mass of said pellets from flowing and conglomerating at any temperature below 140 degrees F.

3. A method as defined in claim 1 in which the cross-sectional dimension of said pellets is between ⅛ and ¾ inches.

4. A method of making a sulfur-asphalt-aggregate paving composition and applying the composition to a roadway, said method comprising the steps of, mixing sulfur with hot molten asphalt at a manufacturing plant site and at a temperature above the melting point of sulfur but not significantly above 300 degrees F. to form a substantially homogeneous mixture of asphalt and sulfur, forming the mixture into solid pellets at the manufacturing plant site, the cross-sectional dimension of said pellets being between about ⅛ and ¾ inches, the ratio of sulfur to asphalt in said pellets being at least 2.3:1.0 on a weight basis so as to keep said pellets in solid, non-flowable form and to prevent a mass of said pellets from flowing and conglomerating at any temperature below 140 degrees F., transporting a mass of said solidified pellets from said manufacturing plant site to a remote site, mixing a predetermined quantity of said solidified pellets with a predetermined and substantially greater quantity of aggregate at said remote site and at a temperature between 240 and 300 degrees F. to liquefy the asphalt and sulfur and to form a sulfur-asphalt-aggregate paving composition, and applying said paving composition to said roadway.

5. A method of making and using an asphalt composition, said method comprising the steps of, mixing sulfur with asphalt and calcium-based mineral filler at a manufacturing plant site and at a temperature above the melting point of sulfur but not significantly above 300 degrees F., forming the mixture into solid pellets at said manufacturing plant site, the cross-sectional dimension of said pellets being at least ⅛ of an inch, the ratio of sulfur to asphalt in said mixture being at least 1.0:1.0 on a weight basis and the ratio of sulfur-asphalt to calcium-based mineral filler being sufficiently high as to keep said pellets in solid, non-flowable form and to prevent a mass of said pellets from flowing and conglomerating, at any temperature below 110 degrees F., transporting a mass of said solidified pellets from said mixing plant site to a remote site, heating said pellets at said remote site to a temperature above the melting point of sulfur but not significantly above 300 degrees F. thereby to liquefy the mixture, and applying the mixture to a material to be coated.

6. A method of making and using an asphalt composition, said method comprising the steps of, mixing sulfur with asphalt and calcium-based mineral filler at a manufacturing plant site and at a temperature above the melting point of sulfur but not significantly above 300 degrees F., forming the mixture into solid pellets at said manufacturing plant site, the ratio of sulfur to asphalt in said mixture being at least 1.0:1.0 on a weight basis and the ratio of sulfur-asphalt to calcium-based mineral filler in said mixture ranging from about 2.2:1.0 to about 3.3:1.0 on a weight basis so as to keep said pellets in solid, non-flowable form and to prevent a mass of said pellets from flowing and conglomerating, at any temperature below 140 degrees F., transporting a mass of said solidified pellets from said mixing plant site to a remote site, heating said pellets at said remote site to a temperature above the melting point of sulfur but not significantly above 300 degrees F. thereby to liquefy the mixture, and applying the mixture to a material to be coated.

7. A method as defined in claim 6 in which said mineral filler is calcium hydroxide.

8. A method as defined in claim 6 in which the ratio of sulfur to asphalt in said mixture is about 1.2:1 on weight basis and the ratio of sulfur-asphalt to calcium-based mineral filler in said mixture is about 2.5:1 on weight basis.

9. A method as defined in claim 6 in which the ratio of sulfur to asphalt in said mixture is about 1.5:1 on a weight basis and the ratio of sulfur-asphalt to calcium-based mineral filler in said mixture is about 2.5:1 on a weight basis.

10. A method as defined in claim 6 in which the ratio of sulfur to asphalt in said mixture is about 1.5:1 on a weight basis and the ratio of sulfur-asphalt to calcium-based mineral filler in said mixture is about 3.3:1 on a weight basis.

11. A method as defined in claim 6 in which the ratio of sulfur to asphalt in said mixture is about 1:1 to 1 on a weight basis and the ratio of sulfur-asphalt to calcium-based mineral filler in said mixture is about 2.2:1 on a weight basis.

12. A method as defined in claim 6 further including the step of mixing aggregate with the sulfur, asphalt and calcium based mineral filler at said manufacturing plant site prior to forming the mixture into pellets.

13. A method as defined in claim 6 further including the step of mixing sand with the sulfur, asphalt and calcium-based mineral filler at said manufacturing plant site prior to forming the mixture into pellets.

* * * * *